United States Patent
Sakamoto et al.

(10) Patent No.: US 7,456,794 B2
(45) Date of Patent: Nov. 25, 2008

(54) FOLDABLE PORTABLE RADIO

(75) Inventors: Akito Sakamoto, Kanagawa (JP); Hideo Nakanishi, Kanagawa (JP); Masao Kobayashi, Kanagawa (JP); Masanori Kikuchi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/568,614

(22) PCT Filed: Oct. 28, 2005

(86) PCT No.: PCT/JP2005/019926

§ 371 (c)(1),
(2), (4) Date: Nov. 3, 2006

(87) PCT Pub. No.: WO2006/046712

PCT Pub. Date: May 4, 2006

(65) Prior Publication Data

US 2007/0164913 A1    Jul. 19, 2007

(30) Foreign Application Priority Data

Oct. 28, 2004    (JP) .............................. 2004-314082

(51) Int. Cl.
H01Q 1/24    (2006.01)
(52) U.S. Cl. ...................................... 343/702
(58) Field of Classification Search ................. 343/702;
455/575, 90
See application file for complete search history.

(56) References Cited

U.S. PATENT DOCUMENTS

2002/0169010 A1* 11/2002 Shoji et al. .................. 455/575

2004/0058721 A1    3/2004 Kanazawa et al.

FOREIGN PATENT DOCUMENTS

| EP | 1445824 | 8/2004 |
|---|---|---|
| EP | 1 538 694 A1 | 6/2005 |
| JP | 2002-335180 | 11/2002 |

(Continued)

OTHER PUBLICATIONS

European Search Report dated Sep. 7, 2007.

Primary Examiner—Hoang V Nguyen
Assistant Examiner—Robert Karacsony
(74) Attorney, Agent, or Firm—Pearne & Gordon LLP

(57) ABSTRACT

In the foldable mobile radio apparatus constructed by coupling two cases to open and close, the high antenna performance can be secured over the wider band with the simple structure. A foldable mobile radio apparatus, includes a first case, an antenna element provided to the first case, a second case, a hinge portion for joining the first case and the second case turnably, a circuit board provided to an inside of the second case and having a ground pattern, and a feeding portion connected to a radio circuit on the circuit board. The hinge portion is formed of a nonconductive resin, and has a rotation shaft made of conductive metal to join the first case and the second case turnably. The rotation shaft is spatially coupled to the antenna element at a predetermined interval, and the rotation shaft is arranged to separate from the ground pattern on the circuit board, and is connected electrically to the feeding portion. Also, the antenna element, the rotation shaft, and the ground pattern on the circuit board operate as an antenna.

10 Claims, 10 Drawing Sheets

FOREIGN PATENT DOCUMENTS

| | | |
|---|---|---|
| JP | 2003-264414 | 9/2003 |
| JP | 2004-104528 | 4/2004 |
| JP | 2004-166191 | 6/2004 |
| JP | 2004-229048 | 8/2004 |
| JP | 2004-343265 | 12/2004 |
| JP | 2005-006091 | 1/2005 |
| WO | 2004/010530 A1 | 1/2004 |

* cited by examiner

FOLDABLE PORTABLE RADIO

TECHNICAL FIELD

The present invention relates to a foldable mobile radio apparatus capable of giving a high antenna performance over a wide band.

BACKGROUND ART

The cellular phone as one type of the mobile radio apparatus is widely spreading nowadays. As the cellular phone, various types of the cellular phone have already been developed. Out of them, the compact folding cellular phone whose portability can be enhanced by folding upper and lower cases when not used is widely used. In this foldable mobile radio apparatus, improvements in size reduction and multiple functions are proceeding. Also, as one of recent improvements in multiple functions, use of the built-in antenna is advanced to improve the design quality.

As an example, as disclosed in JP-A-2002-335180, there is the foldable mobile radio apparatus having such a configuration that the flexible cable is connected to the shield box in the upper case, and then the dipole antenna having the upper shield box and the ground pattern, which is the conductive pattern on the circuit board at a ground potential of the lower case, as radiation elements is operated by exciting directly the upper shield box. According to this configuration, the wideband and high-gain antenna performance can be achieved since an effective area of the antenna can be realized widely.

DISCLOSURE OF THE INVENTION

Problems that the Invention is to Solve

However, in such antenna configuration, the feeding line such as the flexible cable, or the like is needed as the feeding portion to the shield box acting as the radiation element. In this case, based on the background of a reduction in size, weight, and cost of the recent mobile radio apparatus, it is desired that the mobile radio apparatus having a high antenna performance with a more simple structure should be designed.

The present invention has been made in view of the above circumstances, and it is an object of the present invention to provide a foldable mobile radio apparatus capable of giving a high antenna performance over a wider band with a simple structure.

Means for Solving the Problems

A foldable mobile radio apparatus of the present invention, includes a first case; an antenna element provided to the first case; a second case; a hinge portion for joining the first case and the second case turnably; and a circuit board provided to an inside of the second case, and having a ground pattern and a feeding portion; wherein the hinge portion contains a rotation shaft made of conductive metal to join the first case and the second case turnably, the rotation shaft is spatially coupled to the antenna element at a predetermined interval, the rotation shaft is arranged to the hinge portion in a state that the rotation shaft is separated from the ground pattern on the circuit board, and is connected electrically to the feeding portion, and the antenna element, the rotation shaft, and the ground pattern on the circuit board operate as an antenna when a power is fed.

Also, the rotation shaft may be connected the antenna element not via a spatial coupling but via an impedance element.

The antenna element may be constructed by either a conductive plate constituting a part of the first case or a circuit board having the ground pattern.

A total length containing the rotation shaft from the feeding portion has an electric length of about ¼ wavelength at a predetermined frequency, and the antenna element has an electric length of about ½ wavelength at the predetermined frequency.

Preferably, the conductive plate and the metal portion of the rotation shaft may be constructed such that respective surfaces oppose to each other at a predetermined interval.

ADVANTAGE OF THE INVENTION

According to the present invention, the foldable mobile radio apparatus capable of giving the high antenna performance over the wider band with the simple structure can be provided.

Figure 1:
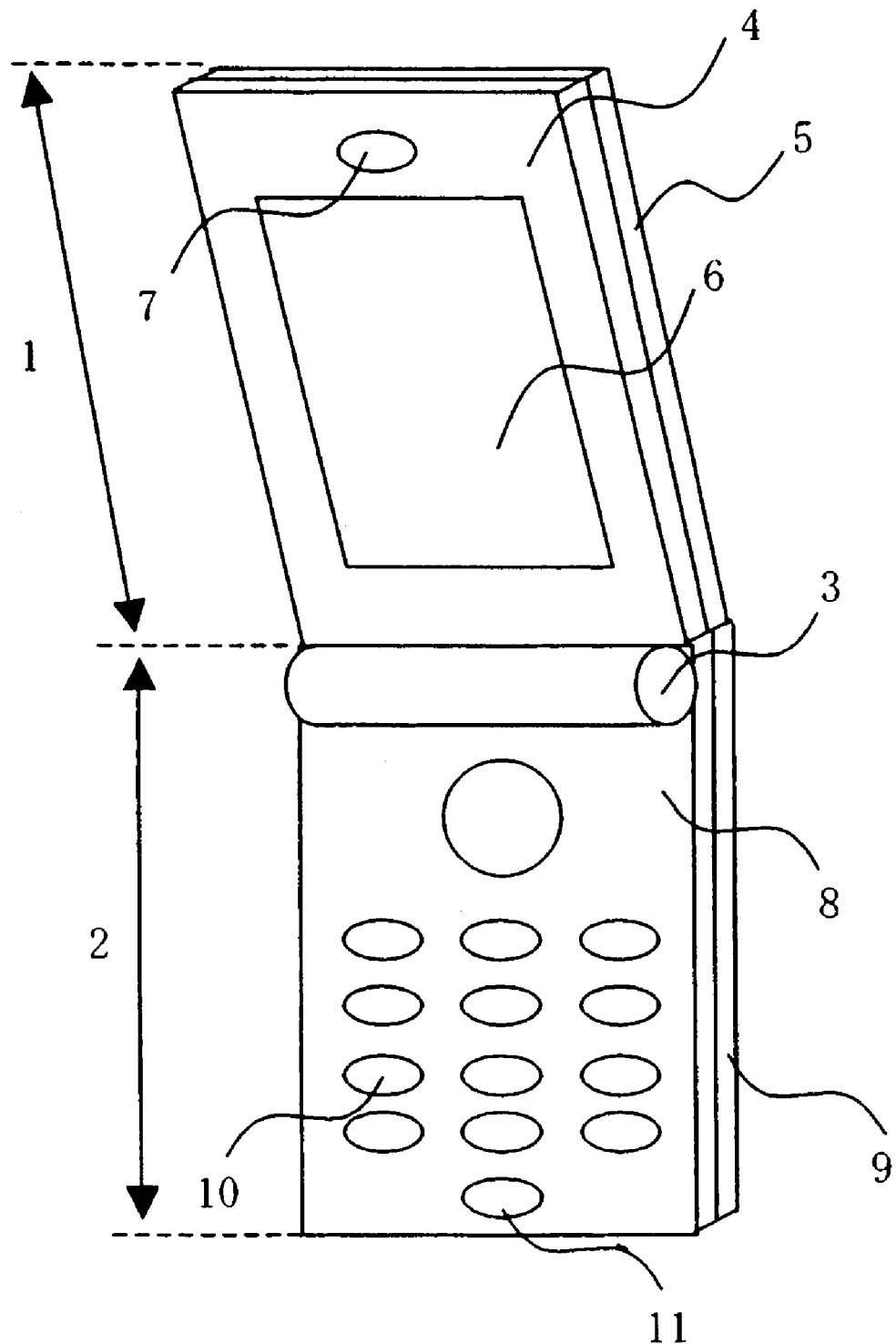
[FIG. 1] A front view showing an external appearance of a foldable mobile radio apparatus according to an embodiment of the present invention.

DESCRIPTION OF REFERENCE NUMERALS 1 first case
2 second case
3 hinge portion
4 upper cover
5 uppercase
6 display portion
7 receiver
8 lower cover
9 lower case
10 operation portion
11 microphone
12 first circuit board
13 second circuit board 14 connection line
15 rotation shaft
16 feeding point
17 conductive plate
18 impedance element

BEST MODE FOR CARRYING OUT THE INVENTION

Embodiments of the present invention will be explained in detail with reference to the accompanying drawings hereinafter.

First Embodiment

As shown in FIG. 1, a foldable mobile radio apparatus according to a first embodiment of the present invention includes a first case 1 and a second case 2 made of a nonconductive ABS resin, for example. The first case 1 and the second case 2 are joined by a hinge portion 3 made of a nonconductive ABS resin, for example, such that both cases can be opened/closed.

The first case 1 is composed of an upper cover 4 and an upper case 5. A display portion 6 formed of a liquid crystal display, or the like, a receiver 7, and the like are provided to the first case 1. The second case 2 is composed of a lower cover 8 and a lower case 9. An operation portion 10 having a plurality of operation key buttons thereon, a microphone 11, and the like are provided to the second case 2, and also a radio circuit, a control circuit, an information processing circuit, and the like are provided to an inside of the second case 2.

Figure 2:
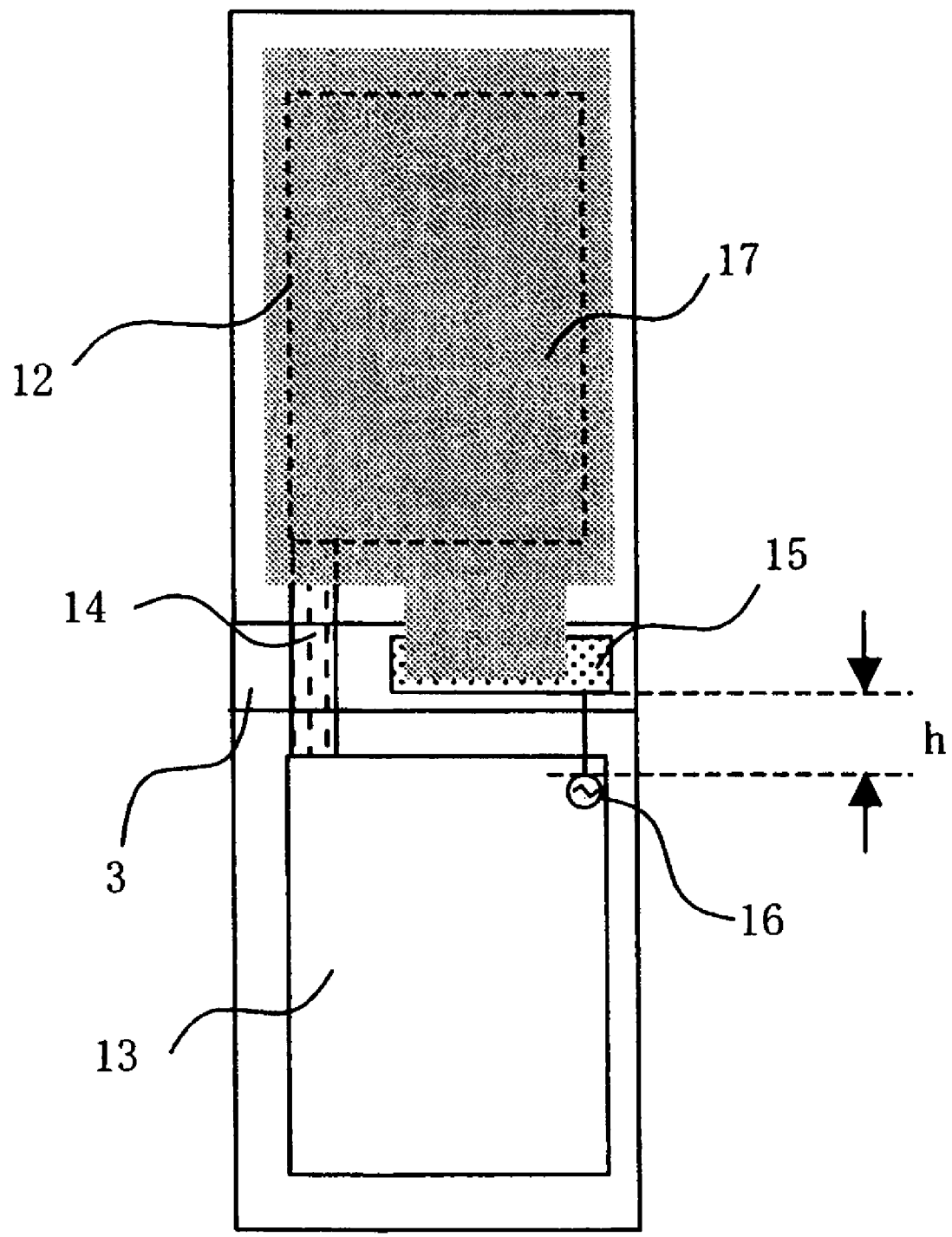
[FIG. 2] A rear view showing a pertinent configuration in a state that a foldable mobile radio apparatus according to the first embodiment is opened.

FIG. 2 is a rear view showing schematically major constituent elements in the first embodiment, and an arrangement relationship among a circuit board, a rotation shaft, and the like is shown. A first circuit board 12 and a second circuit board 13 are installed into the first case 1 and the second case 2 respectively. The first circuit board 12 and the second circuit board 13 are connected electrically via a flexible connection line 14. Also, the hinge portion 3 is connected to open/close the first case 1 and the second case 2. An outer main body of the hinge portion constituting an outer side surface of the hinge portion 3 is formed of a nonconductive ABS resin integrally with the first case 1 and/or the second case 2. Also, a rotation shaft 15 made of conductive metal is arranged in the outer main body of the hinge portion, and has a cylindrical structure having a diameter of 7.5 mm and a length of 24.0 mm in dimension.

Here, the first case 1 and the second case 2 have a length of about 100 mm and a width of about 50 mm, for example, in size respectively. The first circuit board 12 and the second circuit board 13 is formed of a printed board whose thickness is 1 mm, for example. The first circuit board 12 has a length of about 65 mm and a width of about 40 mm, for example, in dimension, and the second circuit board 13 has a length of about 55 mm and a width of about 40 mm, for example, in dimension.

One end of the rotation shaft 15 is connected electrically to a feeding point (feeding portion) 16 of the second circuit board 13. Also, a conductive plate 17 formed of a copper foil, whose width is 45 mm and whose length is 70 mm, for example, is arranged on the inside of the upper case 5, and is arranged at a predetermined interval from the rotation shaft 15. In this case, it is desirable that, in an area where the conductive plate 17 and the rotation shaft 15 overlap with each other, a shape of the conductive plate 17 should be set to a bent shape such that the conductive plate 17 can oppose closely to the rotation shaft 15 having a circular sectional shape (circular column shape) as an area. With such arrangement, the conductive plate 17 and is positioned in close vicinity of the rotation shaft 15 to face to each other, and a capacitive coupling between the conductive plate 17 and the rotation shaft 15 is established when a power is fed. Also, as shown in FIG. 2, the rotation shaft 15 is built in the hinge portion 3 in a state that such rotation shaft is separated (to hold a distance h) from a ground pattern on the second circuit board 13.

In the foldable mobile radio apparatus of the present embodiment, for example, available frequencies of a cellular phone system in GSM (Global System for Mobile Communications) system are set to 900 MHz, 1800 MHz, and 1900 MHz. Of course, the foldable mobile radio apparatus of the present invention can be applied at other frequencies in other communication system by changing design conditions.

In the foldable mobile radio apparatus constructed in this manner in the first embodiment, the rotation shaft 15 and the ground pattern of the second circuit board 13 operate as a $\lambda/4$-series monopole antenna whose resonance frequency is set to around 2000 MHz, for example, when a power is fed. In such case, a total length containing the rotation shaft 15 from the feeding point 16 has an electric length of about ¼ wavelength at 2000 MHz.

Also, since a capacitive coupling between the conductive plate 17 and the ¼-wavelength monopole antenna consisting of the rotation shaft 15 and the ground pattern of the second circuit board 13 is established spatially when a power is fed, the conductive plate 17, the rotation shaft 15, and the ground pattern of the second circuit board 13 operate as a $\lambda/2$-series dipole antenna whose resonance frequency is set to around 900 MHz, for example. In such case, it is to be noted that a length of the conductive plate 17 in the longitudinal direction is equal to an electric length of about ½ wavelength at 900 MHz. Therefore, the conductive plate 17 constitutes an antenna element. A spatial capacitive coupling between the rotation shaft 15 and the conductive plate 17 means that two conductors of the rotation shaft 15 and the conductive plate 17 serves as one capacitor at a predetermined frequency when a power is fed. Also, if such arrangement relationship between the rotation shaft 15 and the conductive plate 17 is satisfied when a power is fed, it can also be expressed that the rotation shaft 15 and the conductive plate 17 are coupled spatially mutually at a predetermined interval when a power is not fed.

Figure 6:
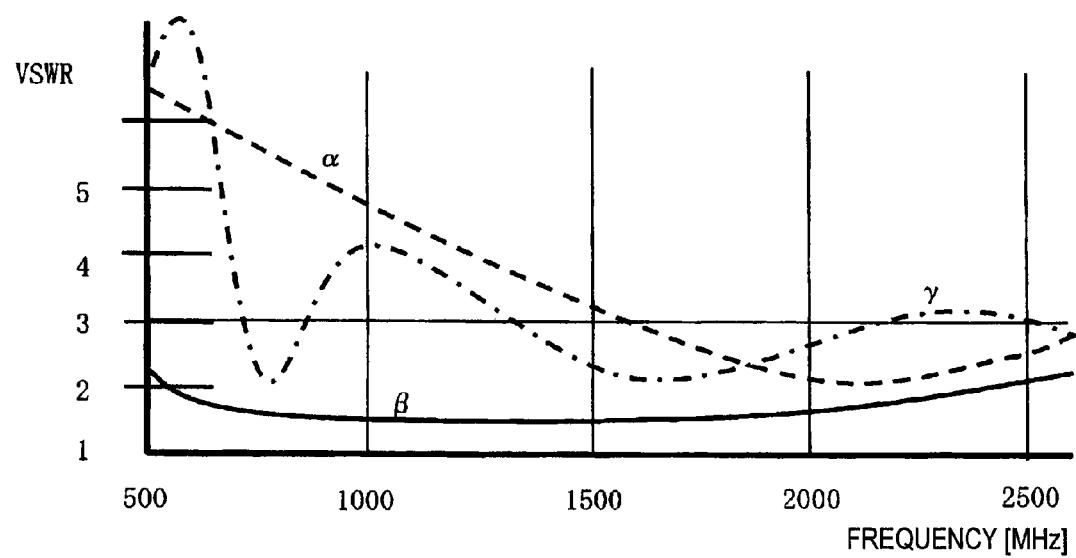
[FIG. 6] A view showing experimental results of the foldable mobile radio apparatus according to the embodiment of the present invention.

FIG. 6 shows experimental results at that time, where an abscissa indicates a frequency (MHz) and an ordinate indicates VSWR (Voltage Standing Wave Ratio). In FIG. 6, the characteristic obtained when only the rotation shaft 15 and the second circuit board 13 are arranged not to arrange the first circuit board 12 is indicated by α. Also, the characteristic obtained when the rotation shaft 15, the second circuit board 13, and the conductive plate 17 are arranged is indicated by β. Here, the rotation shaft 15 and the conductive plate 17 are placed at a predetermined interval to get a capacitive coupling. As understood from the experimental results, the antenna structure of the present invention can satisfy VSWR<3 over the broad band. In this event, it could be understood that the rotation shaft 15 and the conductive plate 17 are not capacitively coupled mutually at a predetermined interval, but the bandwidth is narrower, as indicated by the characteristic γ in FIG. 6, than they are capacitively coupled mutually when they are DC-connected.

As described above, the foldable mobile radio apparatus of the first embodiment has such a structure that the rotation shaft 15 has both a function of opening/closing the upper and lower cases and a function of acting as the antenna element and also the rotation shaft 15 is opposed to the conductive plate 17 at a predetermined interval to get a capacitive coupling. Accordingly, the good antenna characteristic can be achieved over the broad band with a simple structure.

Here, even when any conductive material is employed as the conductive plate 17, the similar advantage can be achieved.

Also, the conductive plate 17 may be formed on the overall surface as in the present embodiment. Alternately, such a configuration may be employed that, for example, a hole is opened in the center portion to place the parts for a sub LCD.

Also, the conductive plate 17 may have a contact connected to the ground of the first circuit board 12.

In the present embodiment, the conductive plate 17 is constructed on the inside of the upper case 5. But the position where the conductive plate 17 is arranged is not particularly limited.

Now, a value of an electrostatic capacity can be optimized depending upon physical structural conditions such as an opposing area, an interval, etc. between the rotation shaft 15 and the conductive plate 17. As a result, the good antenna characteristic can be obtained over the broad band.

Here, in the foldable mobile radio apparatus of the present invention, the similar advantage can be achieved by the structure unlike the circular column structure in the present embodiment if the rotation shaft 15 is formed of the conductive material.

As described above, in the foldable mobile radio apparatus of the present embodiment, unlike the structure in which the overall case is operated as the dipole antenna in the prior art, the antenna can be constructed not to need a feeding portion such as the flexible cable used to feed a power to the antenna element in the upper case, etc. That is, because the conductive rotation shaft 15 around which the upper and lower cases are turned acts as the $\lambda/4$-series monopole antenna and the conductive plate 17 and the rotation shaft 15 are capacitively coupled mutually, the conductive plate 17 and the ground pattern of the second circuit board 13 operate as the $\lambda/2$-series dipole antenna. That is, the good antenna performance can be ensured over the broad band by an interaction between them.

According to this configuration, the antenna structure can be simplified, reduction in a manufacturing cost and a packaging area can be attained, and reduction in size and weight can be achieved.

Second Embodiment

Figure 3:
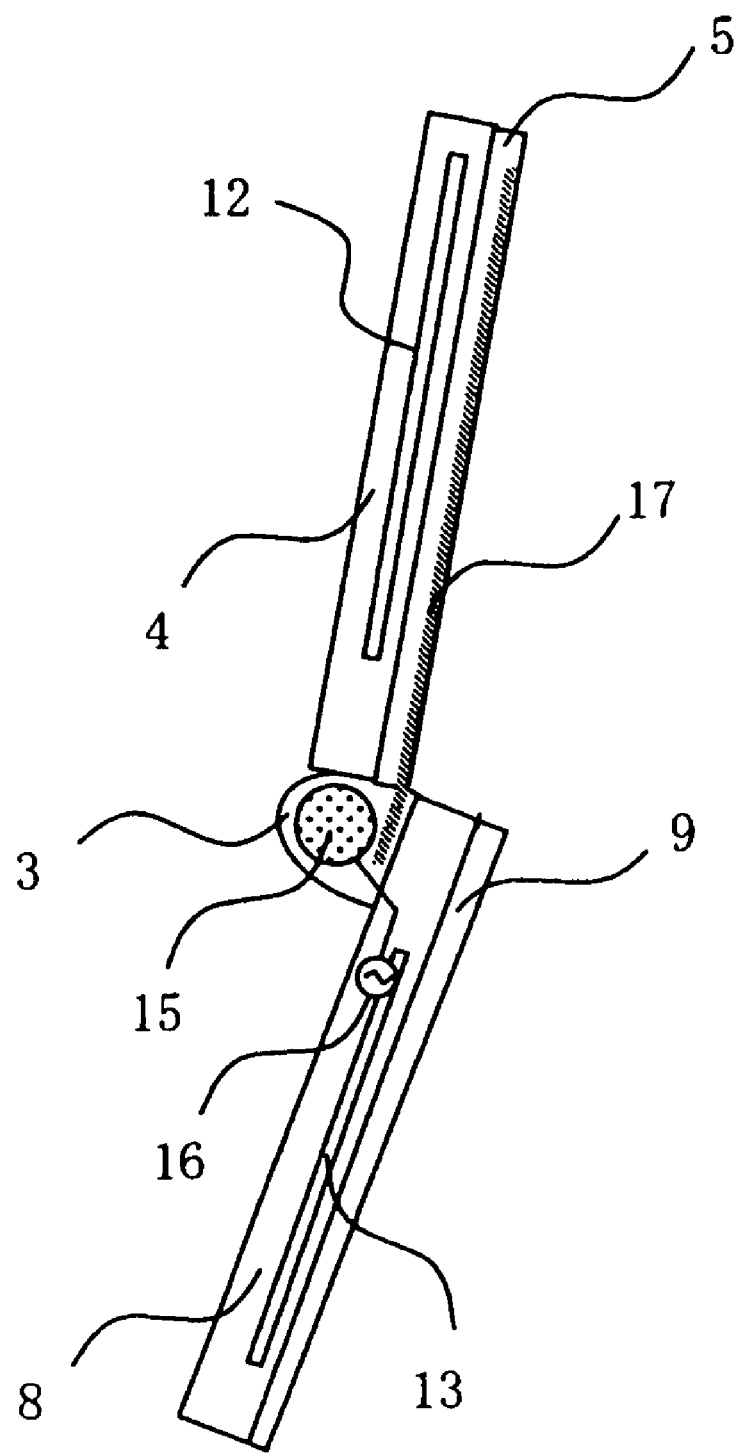
[FIG. 3] A side view showing the pertinent configuration in a state that the foldable mobile radio apparatus according to the first embodiment is opened.
Figure 4:
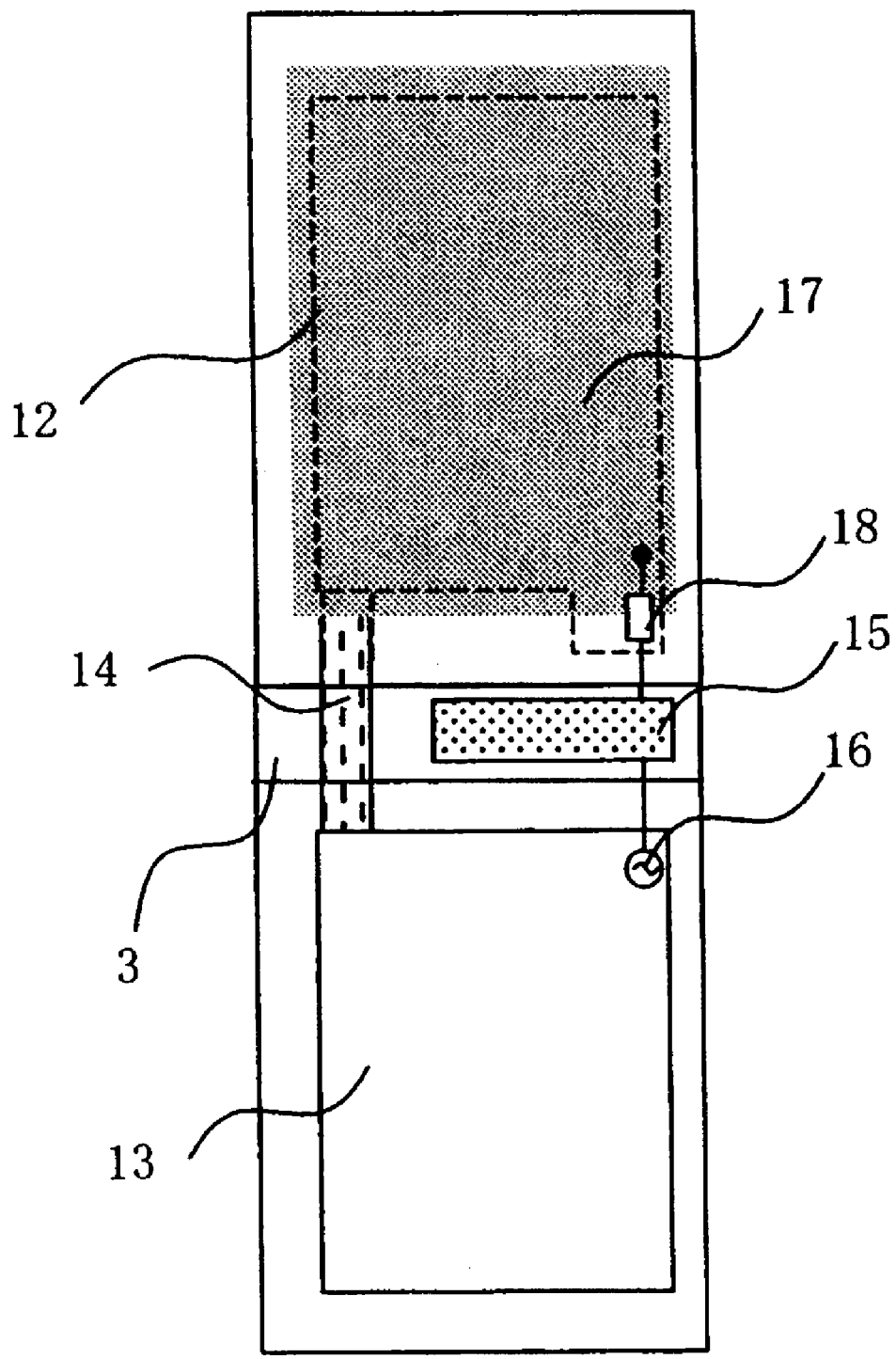
[FIG. 4] A rear view showing a pertinent configuration in a state that a foldable mobile radio apparatus according to a second embodiment is opened.
Figure 5:
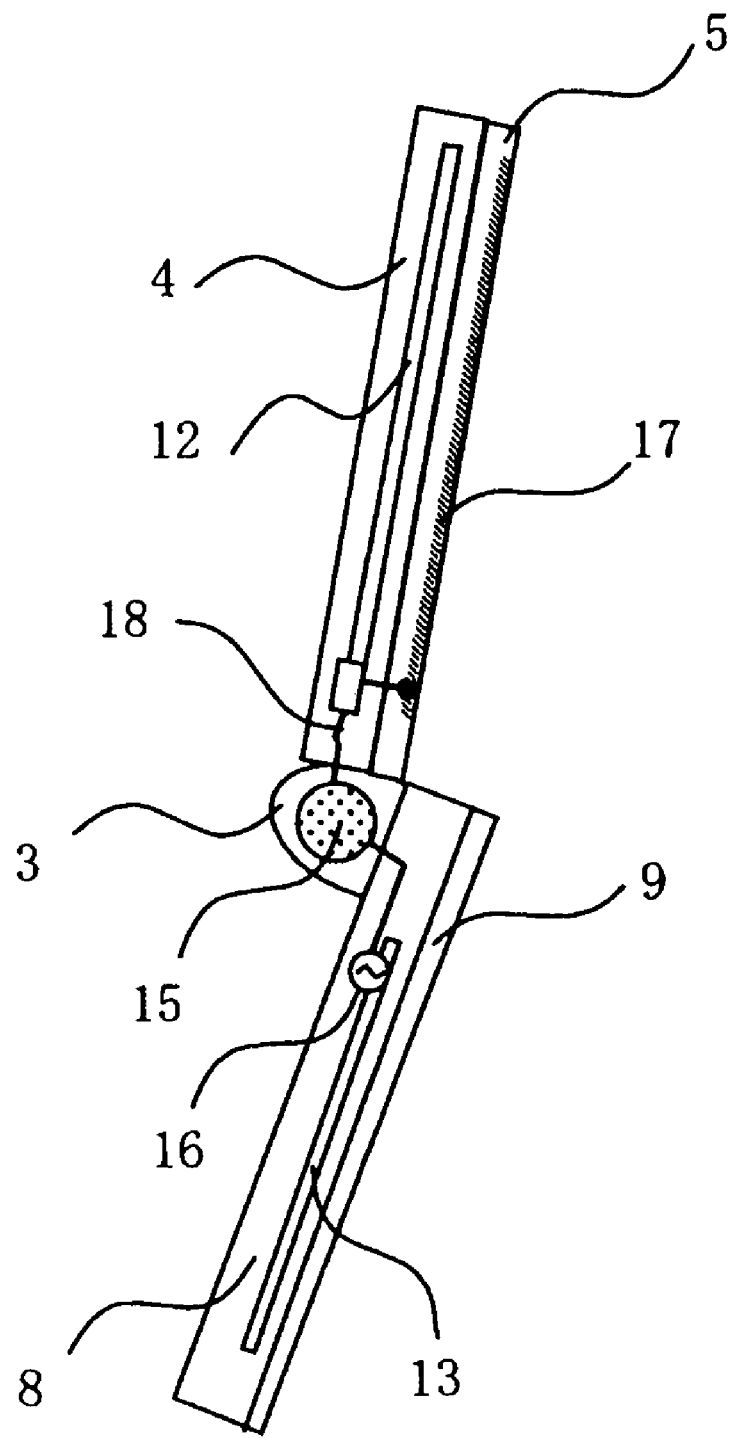
[FIG. 5] A side view showing the pertinent configuration in a state that the foldable mobile radio apparatus according to the second embodiment is opened.

FIG. 4 and FIG. 5 are a rear view and a side view showing a pertinent configuration in a state that a foldable mobile radio apparatus according to a second embodiment is opened, respectively. In FIG. 4 and FIG. 5, respective elements to which the same reference symbols as those in FIG. 2 and FIG. 3 are affixed show the same constituent elements, and their detailed explanation will be omitted herein.

In the foldable mobile radio apparatus according to the second embodiment shown in FIG. 4 and FIG. 5, the first case 1 and the second case 2 are joined by the hinge portion 3 and are opened/closed via the rotation shaft 15, like FIG. 2 and FIG. 3 in the first embodiment. One side surface of the rotation shaft 15 at one end is connected electrically to the feeding point 16 on the second circuit board 13, and the other side surface of the rotation shaft 15 at that one end is connected capacitively to the conductive plate 17 via an impedance element 18 such as a capacitor mounted on the first circuit board 12. According to this structure, the conductive plate 17 and the rotation shaft 15 are capacitively coupled mutually when a power is fed.

As a result, like the first embodiment, because the conductive rotation shaft 15 around which the upper and lower cases are turned acts as the $\lambda/4$-series monopole antenna and the conductive plate 17 and the rotation shaft 15 are capacitively coupled mutually via the impedance element 18, the conductive plate 17, the rotation shaft 15, and the ground pattern of the second circuit board 13 operate as the $\lambda/2$-series dipole antenna. That is, the good antenna performance can be ensured over the broad band by an interaction among them.

Third Embodiment

Figure 7:
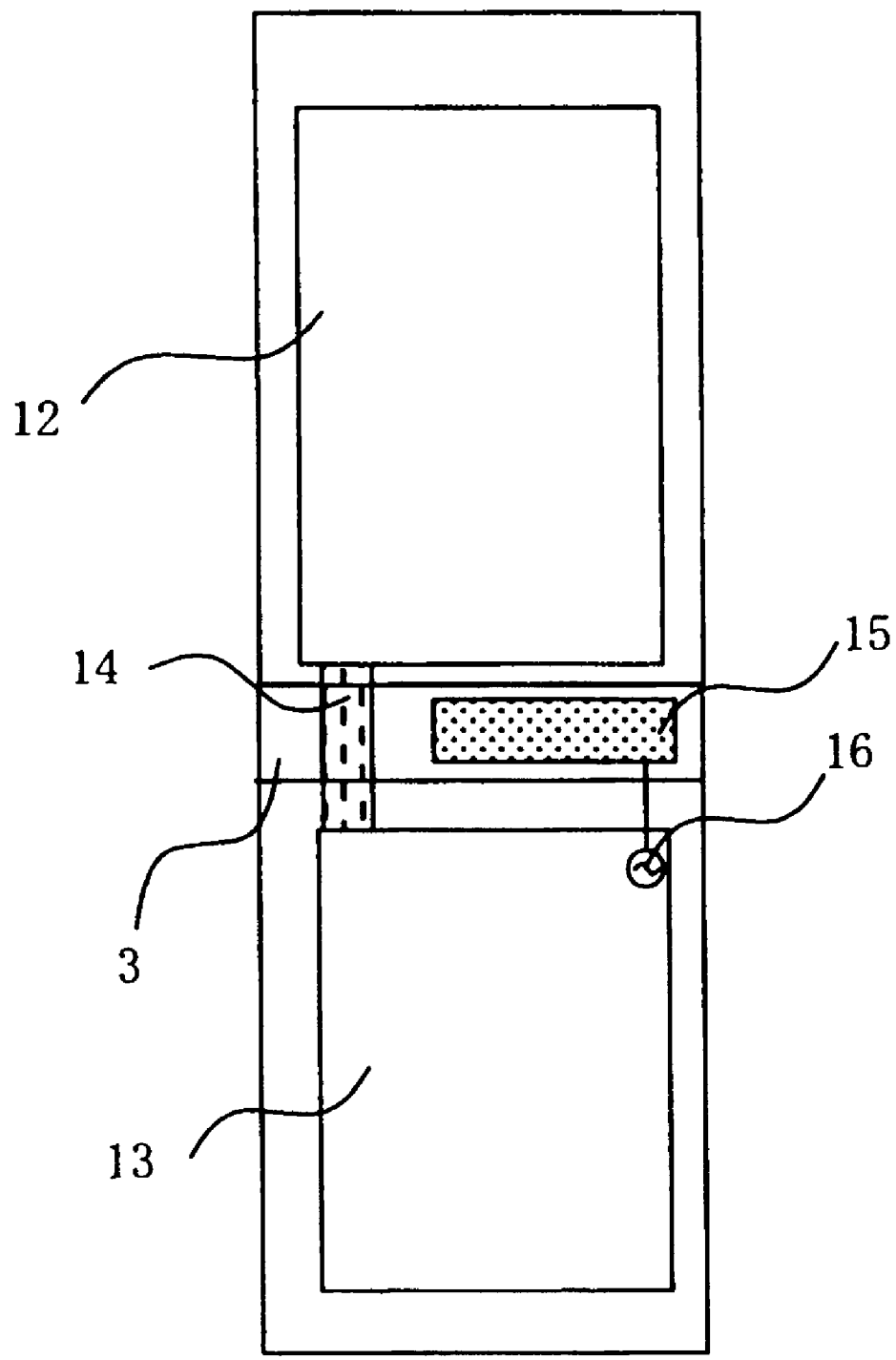
[FIG. 7] A rear view showing a pertinent configuration in a state that a foldable mobile radio apparatus according to a third embodiment is opened.
Figure 8:
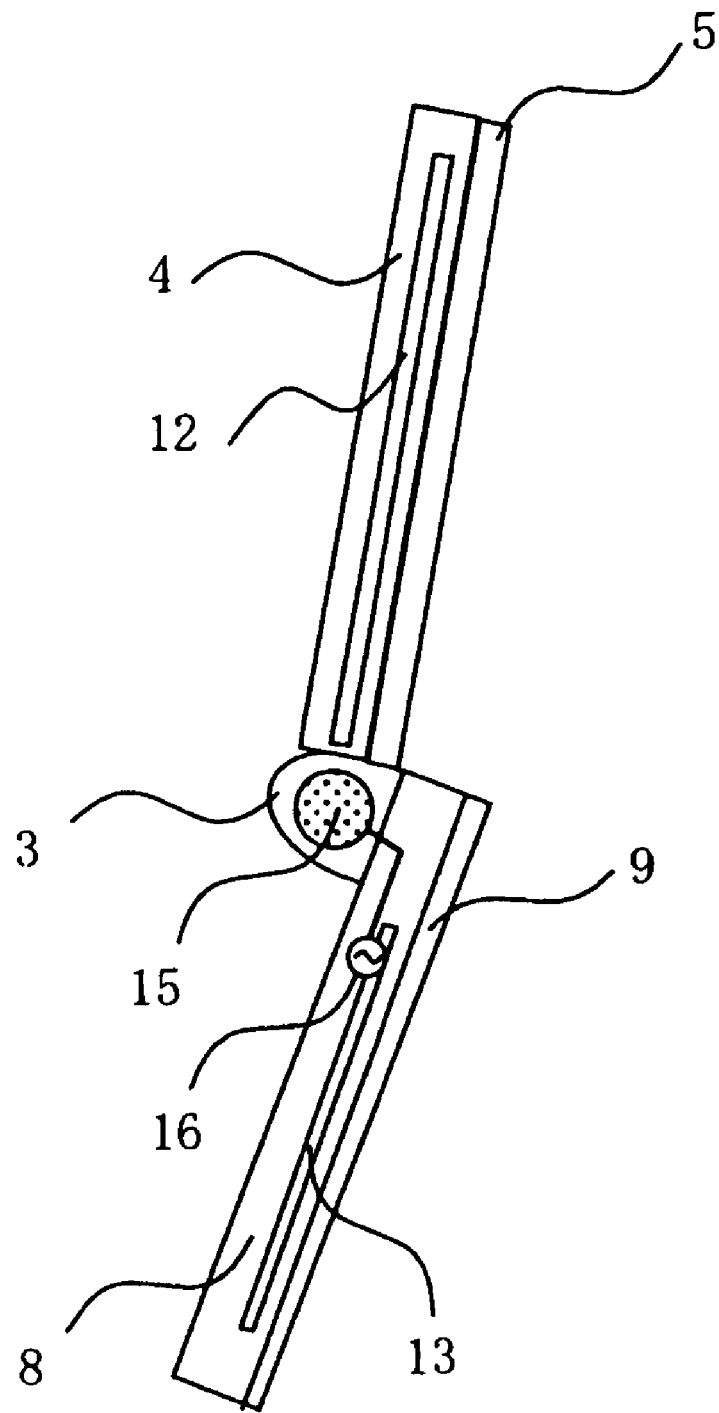
[FIG. 8] A side view showing the pertinent configuration in a state that the foldable mobile radio apparatus according to the third embodiment is opened.

FIG. 7 and FIG. 8 are a rear view and a side view showing a pertinent configuration in a state that a foldable mobile radio apparatus according to a third embodiment is opened, respectively. In FIG. 7 and FIG. 8, respective elements to which the same reference symbols as those in FIG. 2 and FIG. 3 are affixed show the same constituent elements, and their detailed explanation will be omitted herein.

In the foldable mobile radio apparatus of the third embodiment shown in FIG. 7 and FIG. 8, the first case 1 and the second case 2 are coupled by the hinge portion 3 and are opened/closed via the rotation shaft 15, like FIG. 2 and FIG. 3 in the first embodiment.

In the present embodiment, the antenna element is composed of the ground pattern of the first circuit board 12. The rotation shaft 15 is connected electrically to the feeding point 16 on the second circuit board 13. Also, the ground pattern of the first circuit board 12 is arranged at a predetermined interval from the rotation shaft 15.

Here, the ground pattern as the antenna element may be formed on any surface of the front and back surfaces of the first circuit board 12. Also, in case the multiplayer circuit board is employed, the ground pattern as the antenna element may be formed in the inner layer of this circuit board.

In this case, the configuration of the ground pattern may be formed on the overall surface of the circuit board. In addition, the hole may be opened in the center portion to place the parts for the sub LCD, for example.

As a result, like the first embodiment, because the conductive rotation shaft 15 around which the upper and lower cases are turned acts as the $\lambda/4$-series monopole antenna and the ground pattern of the first circuit board 12 and the rotation shaft 15 are arranged at a predetermined interval and capacitively coupled mutually, the first circuit board 12, the rotation shaft 15, and the ground pattern of the second circuit board 13 operate as the $\lambda/2$-series dipole antenna.

Fourth Embodiment

Figure 9:
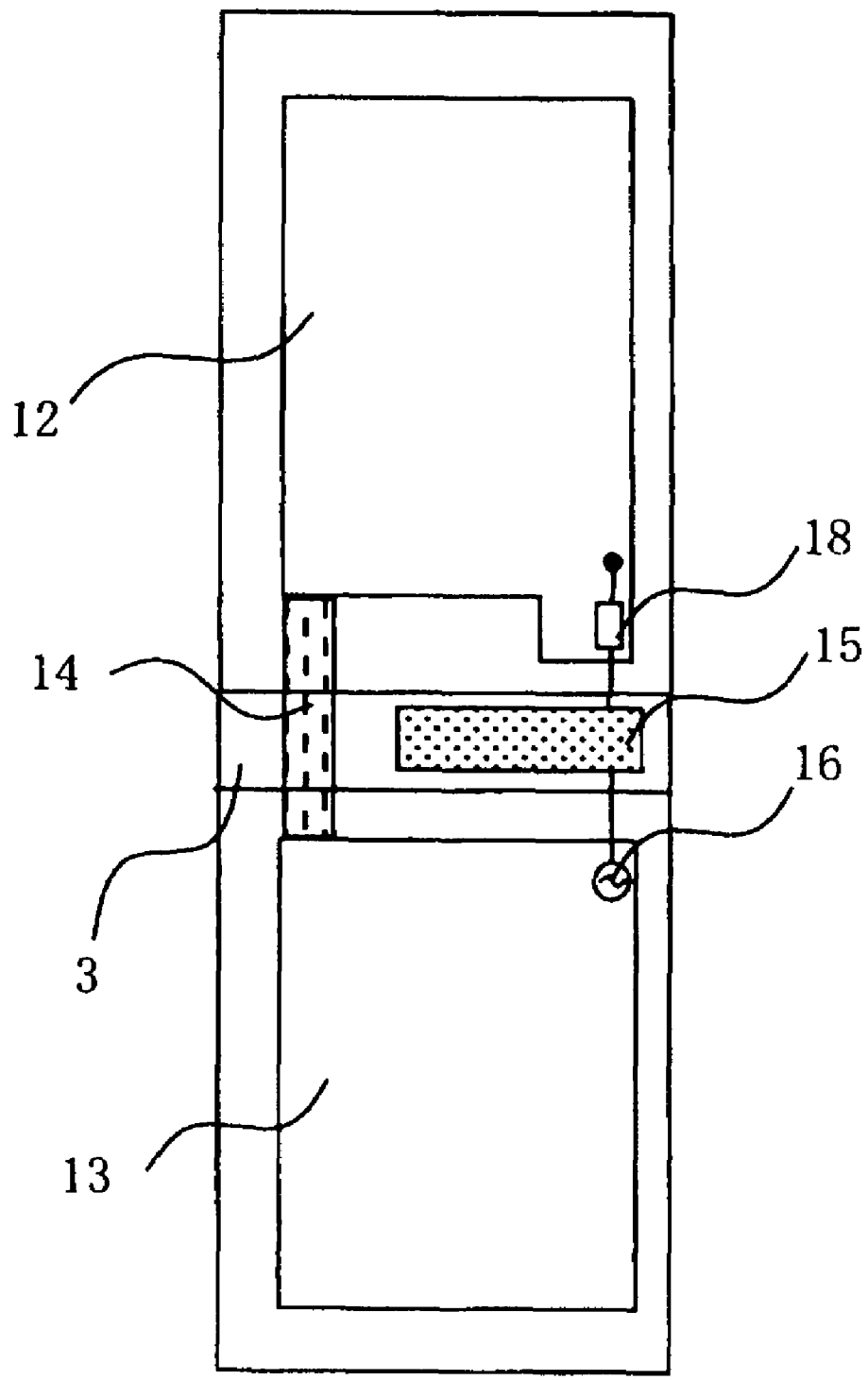
[FIG. 9] A rear view showing a pertinent configuration in a state that a foldable mobile radio apparatus according to a fourth embodiment is opened.
Figure 10:
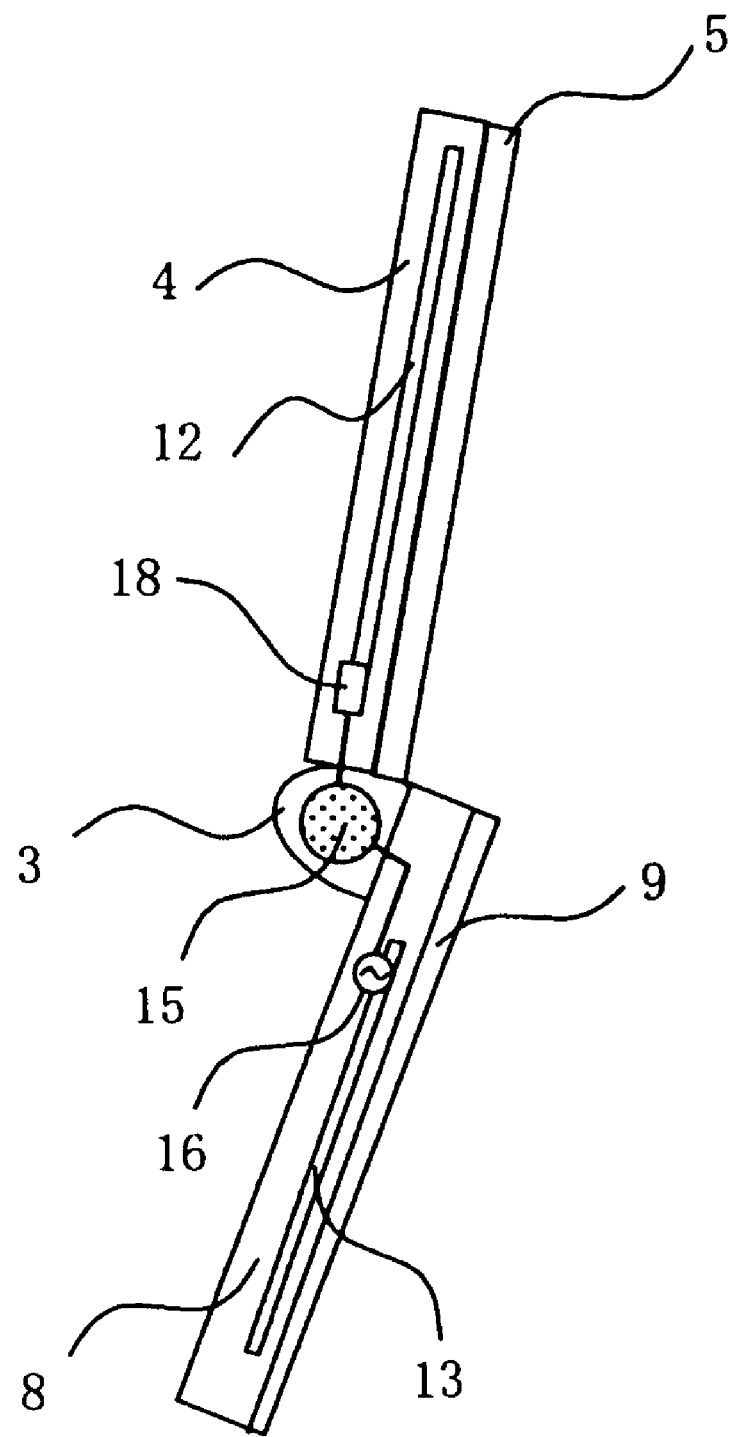
[FIG. 10] A side view showing the pertinent configuration in a state that the foldable mobile radio apparatus according to the fourth embodiment is opened.

FIG. 9 and FIG. 10 are a rear view and a side view showing a pertinent configuration in a state that a foldable mobile radio apparatus according to a fourth embodiment is opened, respectively. In FIG. 9 and FIG. 10, respective elements to which the same reference symbols as those in FIG. 2 and FIG. 3 are affixed show the same constituent elements, and their detailed explanation will be omitted herein.

In the foldable mobile radio apparatus of the fourth embodiment shown in FIG. 9 and FIG. 10, the first case 1 and the second case 2 are coupled by the hinge portion 3 and are opened/closed via the rotation shaft 15, like FIG. 2 and FIG. 3 in the first embodiment.

In the present embodiment, the antenna element is constructed by the ground pattern of the first circuit board 12. One side surface of the rotation shaft 15 at one end is connected electrically to the feeding point 16 on the second circuit board 13, and the other side surface of the rotation shaft 15 at that one end is connected capacitively to the first circuit board 12 via the impedance element 18 such as the capacitor.

For example, a value of the electrostatic capacity of the capacitor is almost 0.5 pF. The value of the electrostatic capacity is changed depending upon the structural conditions such as an opposing interval, etc. between the rotation shaft 15 and the first circuit board 12. As a result, the good antenna characteristic can be secured over the broad band by optimizing the value of the electrostatic capacity.

As a result, like the first embodiment, because the conductive rotation shaft 15 around which the upper and lower cases are turned acts as the $\lambda/4$-series monopole antenna and the ground pattern of the first circuit board 12 and the rotation shaft 15 are capacitively coupled mutually via the impedance element 18, the first circuit board 12, the rotation shaft 15, and the ground pattern of the second circuit board 13 operate as the $\lambda/2$-series dipole antenna.

With the above, various embodiments of the present invention are explained, but the present invention is not limited to the matters disclosed in above embodiments. The present invention is susceptible to variations and modifications made by those skilled in the art based on the recitations of the specification and the well-known technologies, and these matters are contained in the range of protection.

This application is based upon Japanese Patent Application (Patent Application No. 2004-314082) filed on Oct. 28, 2004, the contents of which are incorporated herein by reference.

INDUSTRIAL APPLICABILITY

The present invention can ensure the high antenna performance over the wider band with the simple structure, and is useful to the foldable mobile radio apparatus constructed by coupling two cases to open and close, and the like.

The invention claimed is:

1. A foldable mobile radio apparatus applicable in a first and second frequency band, comprising:
    a first case (1);
    an antenna element (17) that is provided to the first case (1);
    a second case (2) joined to the first case (1) by means of a hinge portion (3), wherein
    the hinge portion (3) has a rotation shaft (15) that joins the first case (1) and the second case (2) such that the first and second case are turnable around the rotation shaft,
    the second case (2) provides for a circuit board (13) that includes a ground pattern and a feeding portion (16), and
    the rotation shaft (15) is separated from the ground pattern of the circuit board (13);
    characterized in that
    the rotation shaft (15) is formed of conductive metal and is electrically connected to the feeding portion (16);
    the antenna element (17) is arranged at a predetermined interval from the rotation shaft (15) such that the antenna element and the rotation shaft are capacitively coupled;
    the rotation shaft (15) and the ground pattern of the circuit board (13) operate as $\lambda/4$-series monopole antenna whose resonance frequency is set in the first frequency band, when power is fed; and
    the antenna element (17), the rotation shaft (15) and the ground pattern of the circuit board (13) operate as a $\lambda/2$-series dipole antenna whose resonance frequency is set in the second frequency band, when power is fed.

2. The foldable mobile radio apparatus according to claim 1, wherein the antenna element is a conductive plate (17) that partly overlaps with the rotation shaft (15) and which is bent such that it fits closely to the rotation shaft.

3. A foldable mobile radio apparatus applicable in a first and second frequency band, comprising:
    a first case (1);
    an antenna element (17) that is provided to the first case (1);
    a second case (2) joined to the first case (1) by means of a hinge portion (3), wherein
    the hinge portion (3) has a rotation shaft (15) that joins the first case (1) and the second case (2) such that the first and second case are turnable around the rotation shaft,
    the second case (2) provides for a circuit board (13) that includes a ground pattern and a feeding portion (16), and
    the rotation shaft (15) is separated from the ground pattern of the circuit board (13);
    characterized in that
    the rotation shaft (15) is formed of conductive metal and is electrically connected to the feeding portion (16);
    the rotation shaft (15) is connected to the antenna element (17) via an impedance element (18);
    the rotation shaft (15) and the ground pattern of the circuit board (13) operate as a $\lambda/4$-series monopole antenna whose resonance frequency is set in the first frequency band, when power is fed; and
    the antenna element (17), the rotation shaft (15) and the ground pattern of the circuit board (13) operate as a $\lambda/2$-series dipole antenna whose resonance frequency is set in the second frequency band, when power is fed.

4. The foldable mobile radio apparatus according to claim 3, wherein the antenna element (17) and the rotation shaft (15) are capacitively coupled.

5. The foldable mobile radio apparatus according to claim 1 or 3, wherein the antenna element is either a conductive plate (17) or another circuit board (12) having a ground pattern, wherein the conductive plate (17) and the another circuit board (12) are parts of the first case (1).

6. The foldable mobile radio apparatus according to claim 1 or 3, wherein a total electrical length from the feeding portion (16) up to and including the rotation shaft (15) is ¼wavelength at a predetermined frequency in the first frequency band; and
    the antenna element (17), the rotation shaft (15) and the ground pattern of the circuit board (13) has an electric length of ½wavelength at a second predetermined frequency.

7. The foldable mobile radio apparatus according to claim 1 or 3, wherein the first and second frequency bands correspond to respective Global System for Mobile Communication frequency bands.

8. The foldable mobile radio apparatus according to claim 2, wherein an antenna characteristic is optimised by changing said predetermined interval between the conductive plate (17) and the rotation shaft (15) and/or an overlapping area between the conductive plate and the rotation shaft.

9. The foldable mobile radio apparatus according to claim 4, wherein the antenna element is a second circuit board (12) having a second ground pattern, and an antenna characteristic is optimised by changing an interval between the rotation shaft (15) and the second circuit board (12).

10. The foldable mobile radio apparatus according to claim 1 or 3, wherein the hinge portion (3) is formed of a nonconductive resin.

* * * * *